(12) United States Patent
Kitagawa

(10) Patent No.: US 9,892,904 B2
(45) Date of Patent: Feb. 13, 2018

(54) LIGHT-EMITTING DEVICE

(71) Applicant: KYOCERA Corporation, Kyoto-shi, Kyoto (JP)

(72) Inventor: Akihiko Kitagawa, Kyoto (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 0 days.

(21) Appl. No.: 15/321,803

(22) PCT Filed: Jul. 17, 2015

(86) PCT No.: PCT/JP2015/070514
§ 371 (c)(1),
(2) Date: Dec. 23, 2016

(87) PCT Pub. No.: WO2016/010137
PCT Pub. Date: Jan. 21, 2016

(65) Prior Publication Data
US 2017/0148623 A1    May 25, 2017

(30) Foreign Application Priority Data
Jul. 18, 2014 (JP) ................. 2014-147897

(51) Int. Cl.
*H01J 61/33* (2006.01)
*H01J 61/54* (2006.01)
(Continued)

(52) U.S. Cl.
CPC ............ *H01J 61/33* (2013.01); *H01J 61/361* (2013.01); *H01J 61/545* (2013.01); *H01J 61/80* (2013.01); *G03B 15/05* (2013.01)

(58) Field of Classification Search
CPC .......... H01J 61/33; H01J 61/545; H01J 61/80; H01J 61/361; G03B 15/05
See application file for complete search history.

(56) References Cited

U.S. PATENT DOCUMENTS

2006/0105898 A1* 5/2006 Ide .......................... C03C 8/24
501/50

FOREIGN PATENT DOCUMENTS

| CN | 1772676 A | 5/2006 |
|---|---|---|
| JP | 09-180677 A | 7/1997 |

(Continued)

OTHER PUBLICATIONS

International Search Report, PCT/JP2015/070514, dated Sep. 8, 2015, 2 pgs.

(Continued)

*Primary Examiner* — Donald Raleigh
*Assistant Examiner* — Kevin Quarterman
(74) *Attorney, Agent, or Firm* — Volpe and Koenig, P.C.

(57) ABSTRACT

There is provided a light-emitting device capable of suppressing a decrease in a light emission amount. A light-emitting device including a container member including a ceramic package provided with a depressed portion serving as a discharge space, and a light transmitting member which is attached to the ceramic package via a joining layer formed of a joining material so as to close the depressed portion; an inert gas encapsulated inside the discharge space; and a couple of discharge electrodes which are disposed in the depressed portion of the ceramic package so as to be spaced from each other, the joining material including glass exhibiting a white color, and oxide ceramic powder.

3 Claims, 9 Drawing Sheets

(51) Int. Cl.
*H01J 61/36* (2006.01)
*H01J 61/80* (2006.01)
G03B 15/05 (2006.01)

(56) References Cited

FOREIGN PATENT DOCUMENTS

| | | |
|---|---|---|
| JP | 2003-095697 A | 4/2003 |
| JP | 2009-073729 A | 4/2009 |
| JP | 2011-096562 A | 5/2011 |
| WO | 2011/040069 A1 | 4/2011 |
| WO | WO 2011040069 A1 * | 4/2011 .............. H01J 61/54 |

OTHER PUBLICATIONS

Chinese Office Action with concise English explanation, Chinese Application No. 201580033847.2, dated Oct. 16, 2017, 7 pgs.

* cited by examiner

LIGHT-EMITTING DEVICE

TECHNICAL FIELD

The present invention relates to a light-emitting device such for example as an electric-discharge lamp.

BACKGROUND ART

In the related art, a light-emitting device such for example as an electric-discharge lamp having a structure in which an inert gas is filled in a glass tube has been known. In the light-emitting device of the related art, a couple of discharge electrodes are fixed to the glass tube with protruding from an end portion of the glass tube into a discharge space, and a discharge induction electrode is disposed on an outer periphery of the glass tube. An example of the electric-discharge lamp is disclosed in Japanese Unexamined Patent Publication JP-A 09-180677 (1997).

In recent years, for example, the light-emitting device such as an electric-discharge lamp is needed to be further miniaturized so as to mount the same to a portable terminal and the like. However, the light-emitting device having the conventional glass tube has a structure that is difficult to be made small. In order to solve the miniaturization problem, a structure of a light-emitting device which includes a package and a light transmitting member joined to the package and has a discharge space in a container member has been known. An example of the light-emitting device is disclosed in Japanese Unexamined Patent Publication JP-A 2011-96562.

The light-emitting device including the package and the light transmitting member joined to the package has a problem that a light emission amount decreases because the package and the light transmitting member are joined via a joining material and the light generated in the discharge space is thus likely to be absorbed by the joining material.

The invention has been made in view of the above problems, and an object thereof is to provide a light-emitting device capable of suppressing a decrease in a light emission amount due to a joining material for joining a package and a light transmitting member.

SUMMARY OF INVENTION

A light-emitting device according to an embodiment of the invention includes a container member including a ceramic package provided with a depressed portion serving as a discharge space, and a light transmitting inorganic member which is attached to the ceramic package via a joining layer formed of a joining material so as to close the depressed portion; an inert gas encapsulated inside the discharge space; and a couple of discharge electrodes which are disposed in the depressed portion of the ceramic package so as to be spaced from each other, the joining material including glass exhibiting a white color, and oxide ceramic powder.

DESCRIPTION OF EMBODIMENTS

Figure 1:
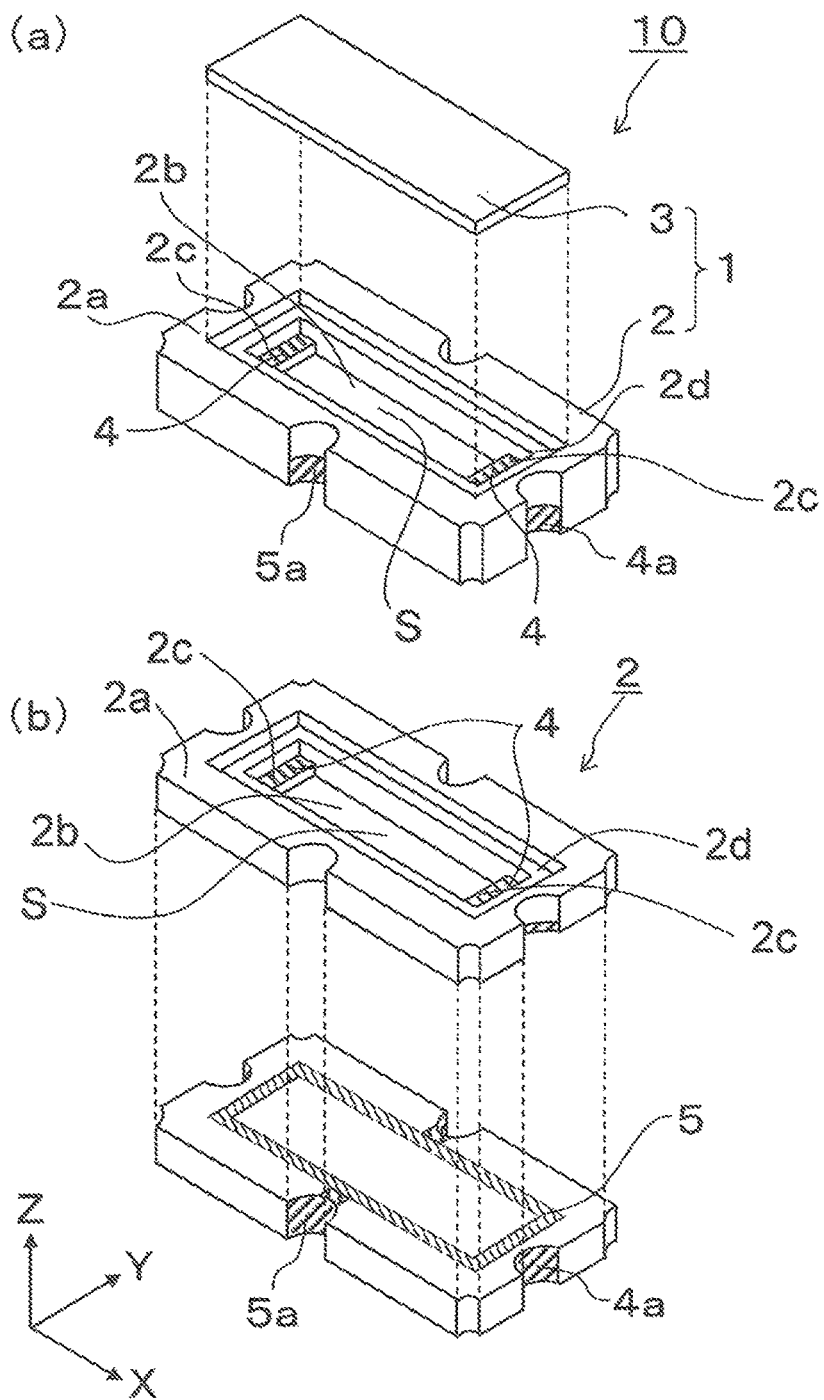
FIG. 1(a) is an exploded perspective view illustrating a light-emitting device except a joining material according to one embodiment of the invention.
FIG. 1(b) is an exploded perspective view of a ceramic package for explaining a discharge induction electrode of the light-emitting device shown in FIG. 1(a)

Hereinafter, a light-emitting device according to one embodiment of the invention will be described with reference to the accompanying drawings. Also, for convenience of descriptions, while defining a Cartesian coordination system XYZ and also defining a positive-side of the Z direction as upper, terms of an upper surface (surface) or a lower surface are appropriately used for the light-emitting device.

Also, in the descriptions of the embodiment and the like, the configurations, which are the same or similar as or to the described configurations, are denoted with the same reference numerals, and the descriptions thereof may be omitted.

Embodiments

A light-emitting device 10 according to an embodiment of the invention is described with reference to FIGS. 1 to 5. The light-emitting device 10 is embedded in a portable terminal such as a smart phone or an imaging device such as a digital camera. The light-emitting device 10 can instantaneously generate a flash light in a larger amount of light by using a discharge action of a rare gas, for example, as compared to an LED.

The light-emitting device 10 according to one embodiment of the invention has a configuration as shown in FIGS. 1 to 5, and includes a container member 1, an inert gas 6, and a couple of discharge electrodes 4. The container member 1 includes a ceramic package 2 provided with a depressed portion 2b serving as a discharge space and a light transmitting member 3, which is a light transmitting inorganic member which is joined to the ceramic package 2 via a joining layer 7a formed of a joining material 7 so as to close the depressed portion 2b. Also, the couple of discharge electrodes 4 are disposed on opposite sidewalls 2a of the ceramic package 2 and has opposite parts 4b disposed to face each other. The joining material 7 comprises glass exhibiting a white color and oxide ceramic powder. Also, a light emission direction of the light-emitting device 10 is a positive side of the Z direction.

Also, the light-emitting device 10 may have a discharge induction electrode 5 in the ceramic package 2 so as to easily start the discharge in the discharge space S. The light-emitting device 10 is configured so that the annular discharge induction electrode 5 is disposed in the ceramic package 2 so as to be below the couple of discharge electrodes 4 and surround the depressed portion 2b. Also, the opposite parts 4b of the couple of discharge electrodes 4 are positioned more inwardly than an inner periphery of the discharge induction electrode 5, as seen from a plan view.

By the above configuration, the light-emitting device 10 can be made smaller and easily generate the discharge between the couple of discharge electrodes 4. Also, since the container member 1 can sufficiently secure the discharge space S inside the ceramic package 2 and electrode areas of the discharge electrodes 4 can be made great, the light-emitting device 10 can effectively generate the discharge between the couple of discharge electrodes 4.

Also, the light-emitting device 10 has the annular discharge induction electrode 5, so that it is possible to ionize the entire inert gas 6, and particularly, to ionize the inert gas 6 in the vicinity of the discharge electrodes 4. Therefore, the discharge is likely to occur between the couple of discharge electrodes 4. In this way, according to the light-emitting device 10, the discharge induction electrode 5 can facilitate the start of the discharge and the couple of discharge electrodes 4 can effectively cause the discharge.

The light-emitting device 10 is an electric-discharge lamp, and is configured to use light emission by the inert gas 6 between the couple of discharge electrodes 4. Also, the container member 1 including the ceramic package 2 and the light transmitting member 3 joined to the sidewalls 2a of the ceramic package 2, the couple of opposite discharge electrodes 4 and the discharge induction electrode 5 constitute a light emission tube (discharge tube). For example, a portable terminal device such as a smart phone has a camera function so as to image a photographic subject, and also has an illumination light source, which is to be used upon imaging at a dark place such as night. The light-emitting device 10 is configured to generate a flash light by discharging the light emission tube (discharge tube), and can be used for a portable terminal device such as a smart phone. Also, the utility of the light-emitting device 10 is not limited to the illumination light source. For example, the light-emitting device can be used for a utility such as rapid heating where the high-output energy is required in a short time.

The container member 1 includes the ceramic package 2 and the light transmitting member 3 which is attached to the sidewalls 2a of the ceramic package 2 via the joining layer 7a formed of the joining material 7. The container member 1 has therein the discharge space S, and the discharge space S is defined by the ceramic package 2 and the light transmitting member 3.

Also, the discharge electrodes 4 are electrodes used for causing an insulation breakdown in a gas by a potential difference and enabling a current to flow through the gas, and include a couple of an anode and a cathode. Also, the discharge induction electrode is an electrode provided separately from the discharge electrodes 4 so as to start the discharge in the discharge space, and is configured to ionize the gas (inert gas) between the couple of discharge electrodes 4, thereby facilitating the start of the discharge. In the meantime, the discharge induction electrode 5 is also referred to as a trigger electrode.

As shown in FIGS. 1 to 5, the light-emitting device 10 has a configuration where the ceramic package 2 has a couple of step portions 2c formed at the opposite sidewalls 2a and the couple of discharge electrodes 4 is disposed on the couple of step portions 2c. Also, the light-emitting device 10 has a length in a longitudinal direction (X direction) of 3.2 mm to 50 mm, for example, a length in a width direction (Y direction) of 1.2 mm to 30 mm, for example, and a height of 0.3 mm to 5 mm, for example, has a configuration as shown in FIGS. 1 to 5, and enables the miniaturization, the thinning or the reduction in height.

There is described the configuration where the ceramic package 2 of the container member 1 has the couple of step portions 2c at the opposite sidewalls 2a and the couple of discharge electrodes 4 is disposed on the couple of step portions 2c. In the meantime, as described later, in the light-emitting device 10, the couple of discharge electrodes 4 is preferably disposed so that parts thereof are exposed to the discharge space S and the discharge can be thus generated between the couple of discharge electrodes 4.

As shown in FIG. 1, the ceramic package 2 has the depressed portion 2b surrounded by the sidewalls 2a and serving as the discharge space S. A shape of the depressed portion 2b is not limited to a rectangular shape as shown in FIG. 4(b), as seen from a cross-sectional view. For example, the depressed portion may have any sectional shape inasmuch as the light emission resulting from the discharge is to be generated in the depressed portion 2b serving as the discharge space S. That is, the shape of the depressed portion 2b may be a V-shape or a shape of which a width of an opening gradually decreases from an upper side of the ceramic package 2 toward a lower side thereof, as seen from a cross-sectional view.

The container member 1 has the step portions 2c provided at the opposite sidewalls 2a (the sidewalls 2a facing each other in the X direction) so as to provide the couple of discharge electrodes 4 at the ceramic package 2, and the step portions 2c are configured as the couple of step portions 2c. That is, in the ceramic package 2, a region including a central part is surrounded by the four peripheral sidewalls 2a and the depressed portion 2b is thus formed. Also, the couple of step portions 2c is disposed on inner peripheries-side of the couple of sidewalls 2a facing each other in the longitudinal direction (X direction), and the couple of discharge electrodes 4 is disposed on the couple of step portions 2c. In this way, the container member 1 has the couple of discharge electrodes 4 disposed on the couple of step portions 2c in the longitudinal direction (X direction), so that it is possible to cause the discharge in the longitudinal direction (X direction) of the discharge space S and to excite the more inert gas 6. As a result, it is possible to improve the light emission efficiency.

Also, the container member 1 may have the couple of step portions 2c at the sidewalls 2a facing each other in the width direction (Y direction) (the sidewalls 2a facing each other in the Y direction) so as to provide the ceramic package 2 with the couple of discharge electrodes 4. The container member 1 has the couple of discharge electrodes 4 in the width direction (Y direction), so that a distance between the couple of discharge electrodes 4 becomes shorter. Thereby, the discharge is more likely to be generated in the discharge space S.

Figure 4:
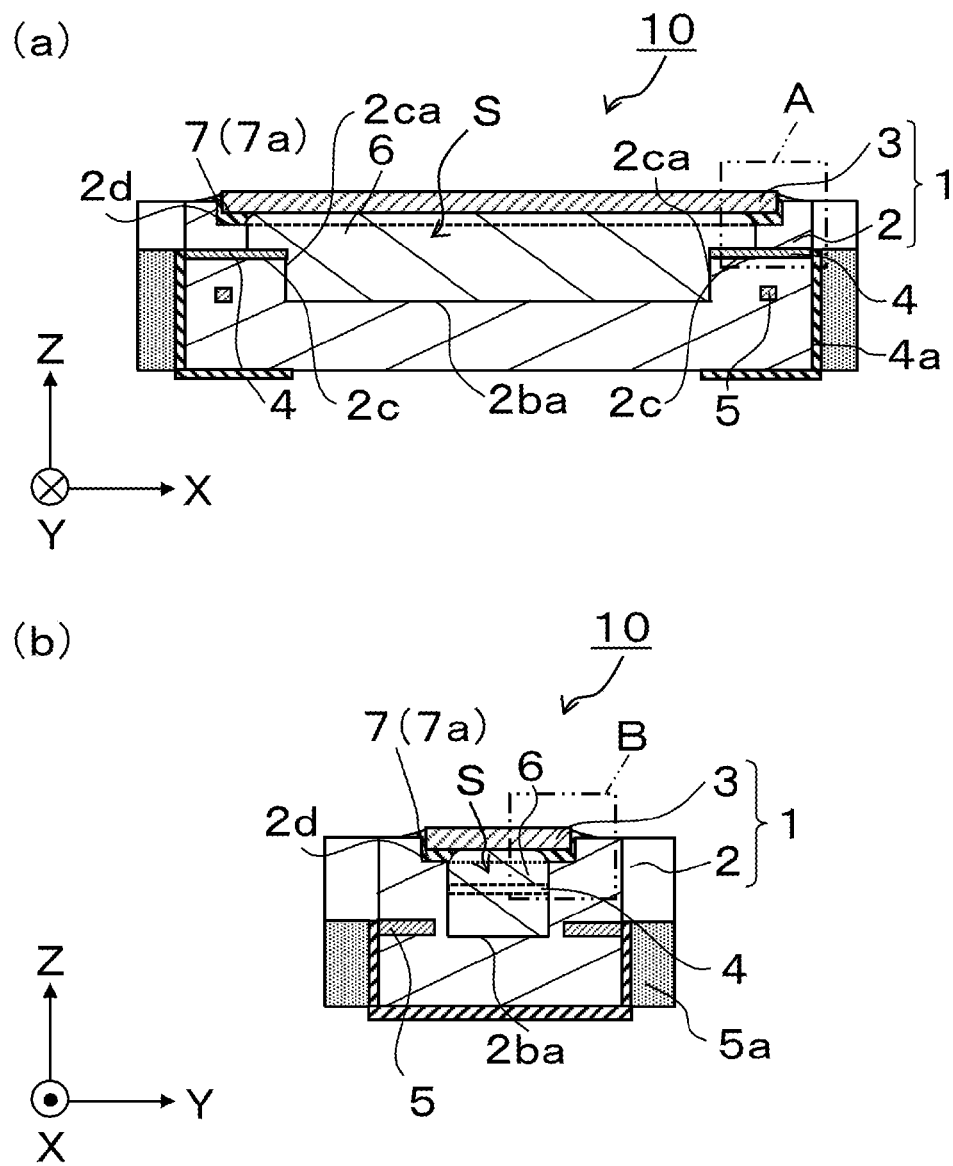
FIG. 4(a) is a sectional view taken along the line A-A in FIG. 3(a)
FIG. 4(b) is a sectional view taken along the line B-B in FIG. 3(a)

As shown in FIG. 4, the discharge electrode 4 is disposed on the step portion 2c, and an upper surface of the step portion 2c is substantially parallel with a bottom surface 2ba (X axis) of the depressed portion 2b, as seen from a cross-sectional view. The description "substantially parallel"

means that an angle between the upper surface of the step portion 2c and the bottom surface 2ba (X axis) of the depressed portion 2b is within a range of 0° to ±5°. In the meantime, the angle 0° indicates that the upper surface of the step portion 2c and the bottom surface 2ba are parallel with each other.

Also, the upper surface of the step portion 2c may be inclined toward the bottom surface 2ba of the depressed portion 2b. That is, the upper surface of the step portion 2c may be inclined relative to the bottom surface 2ba (X axis) of the depressed portion 2b within a range of 10° to 60°. The couple of discharge electrodes 4 is provided on the inclined upper surfaces of the step portions 2c, so that the opposite areas of the couple of discharge electrodes 4 increase although it is pseudo. When the opposite areas of the couple of discharge electrodes 4 increase, it is possible to suppress a decrease in the lifetime of the electrodes.

Also, the couple of step portions 2c are provided on the inner peripheries-side of the sidewalls 2a of the ceramic package 2 so that heights thereof from the bottom surface 2ba of the depressed portion 2b are substantially equal. The heights of the couple of step portions 2c from the bottom surface 2ba (heights of side surfaces 2ca) are 10 μm to 500 μm, for example. Also, the description "substantially equal" means that the height of one step portion 2c from the bottom surface 2ba is within a range of 65% to 135% of the height of the other step portion 2c from the bottom surface 2ba.

Also, the ceramic package 2 is made of a substantially insulating material and has a substantially rectangular shape, as seen from a plan view. As the insulating material of the ceramic package 2, a ceramic material or a resin material such as an epoxy resin, a polyester resin or the like may be exemplified. Also, the ceramic package 2 is formed of an insulating material exhibiting a white color, as the ceramic material. The ceramic package 2 may be formed of a material exhibiting a white color and having reflectance of 70% or greater in all wavelengths of a visible light region (a wavelength range of about 400 nm to 800 nm) so as to effectively reflect the light resulting from the discharge on an inner wall surface of the depressed portion 2b of the ceramic package 2. As the material, aluminum oxide sintered body (alumina ceramics), low-temperature co-fired ceramics and the like may be exemplified. The ceramic package 2 exhibits a white color, so that it is possible to increase the reflectance of the inner wall surface of the depressed portion 2b of the ceramic package 2. Therefore, it is possible to suppress a decrease in a light emission amount. Also, the container member 1 includes the ceramic package 2 made of ceramics, so that the durability in use is improved.

Figure 2:
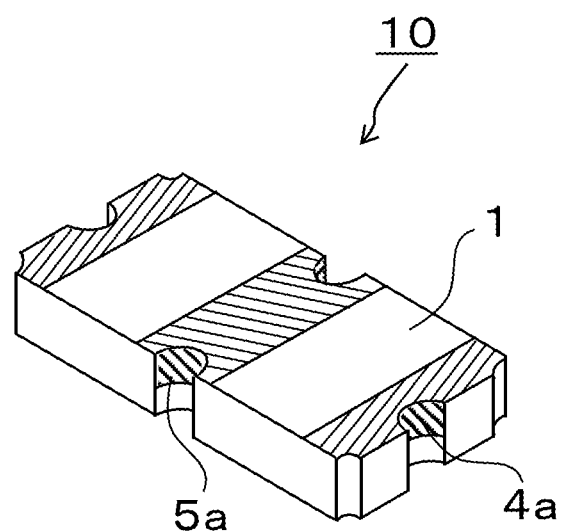
FIG. 2 is a perspective view illustrating a state of a lower surface-side of the light-emitting device shown in FIG. 1.
Figure 2:
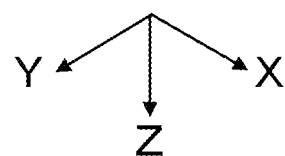

As shown in FIGS. 1 and 2, the substantially rectangular shape of the ceramic package 2 includes a shape where four corner portions of the ceramic package 2 are inwardly depressed and a shape where the four corner portions have C-chamfered or R-chamfered structure, so as to reduce a possibility of the damage upon conveyance or upon mounting. Also, the description "as seen from a plan view" indicates a line of sight from above toward a negative direction of the Z axis, in FIG. 1. The curved depressed portion is provided as a groove shape extending from an upper surface to a lower surface of the ceramic package 2 at the corner portion of the ceramic package 2. A cross-sectional shape of the depressed portion is a curved shape.

Also, as shown in FIGS. 1 and 2, the substantially rectangular shape of the ceramic package 2 may include a shape where the side surfaces of the container member 1 are inwardly recessed in a curved shape, so as to provide the lower surface-side of the container member 1 with external electrodes 4a connected to the discharge electrodes 4 and external electrodes 5a connected to the discharge induction electrode 5. In this case, wall surfaces of the curved recessed portions are provided with the external electrodes 4a and the external electrodes 5a, respectively. Also, the light-emitting device 10 may be configured as a surface-mounting type having the external electrodes 4a and 5a on the lower surface of the container member 1. The light-emitting device 10 can enable the miniaturization, the thinning or the reduction in height and can be mounted in an electronic device, for example. The electronic device may be a digital camera, a portable phone having a camera, a smart phone having a camera, or the like.

Also, the curved recessed portion is provided as a groove shape extending from the upper surface to the lower surface of the ceramic package 2 on the side surface of the ceramic package 2, like the curved depressed portion. A cross-sectional shape of the recessed portion is a curved shape, for example, a semi-circular shape. In the meantime, the cross-sectional shape of the recessed portion is not limited to the semi-circular shape, and may be a half oval shape, a semi-elliptical shape or the like. That is, the shape is not particularly limited.

The light transmitting member 3 is a light transmitting inorganic member having a substantially rectangular shape, as seen from a plan view, and is joined to upper surfaces of the sidewalls 2a of the ceramic package 2 via the joining layer 7a formed of the joining material 7 so as to close the depressed portion 2b of the ceramic package 2. The substantially rectangular shape of the light transmitting member 3 includes a shape where four corner portions are outwardly convex in a curved shape, so as to reduce a possibility of the damage upon assembling, for example.

Figure 3:
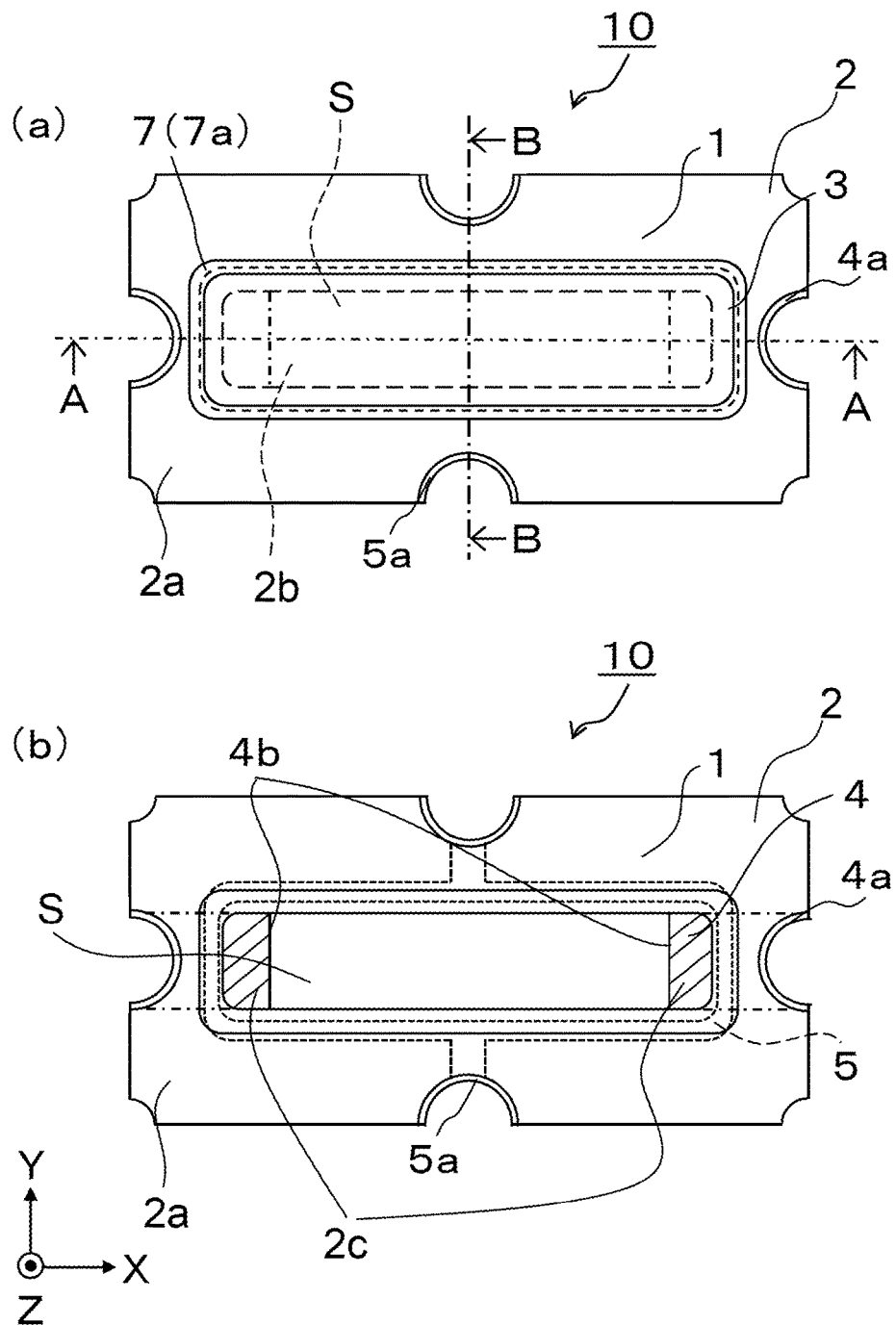
FIG. 3(a) is a plan view illustrating the light-emitting device according to one embodiment of the invention.
FIG. 3(b) is a plan view illustrating the light-emitting device except a light transmitting member and the joining material.
Figure 5:
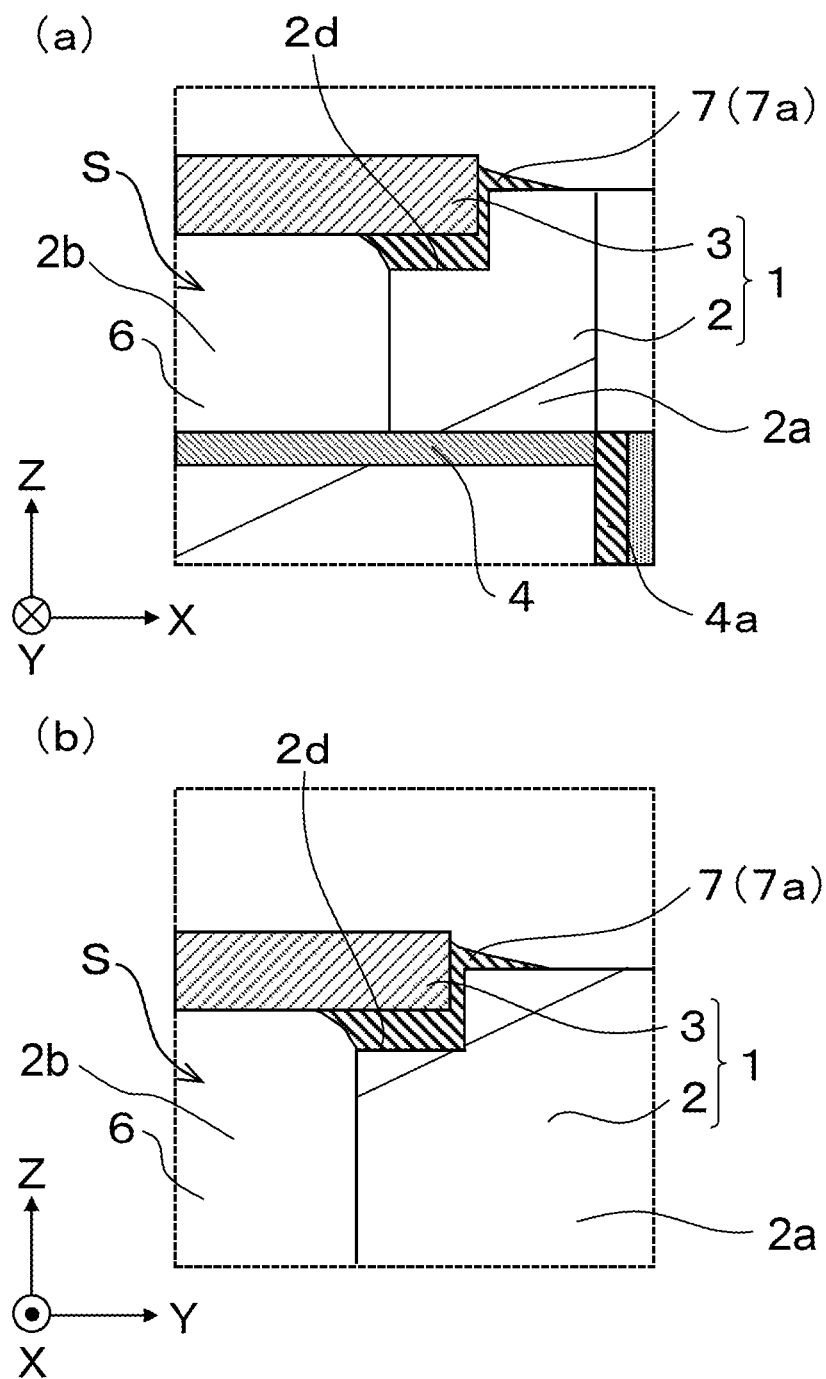
FIG. 5(a) is an enlarged view illustrating a part indicated by reference sign A in FIG. 4(a)
FIG. 5(b) is an enlarged view illustrating a part indicated by reference sign B in FIG. 4(b)

Also, in the light-emitting device 10, as shown in FIGS. 3 to 5, a step portion 2d may be provided over an entire circumference of the inner peripheries-side of the sidewalls 2a located at the upper surface-side of the ceramic package 2, and the light transmitting member 3 may be joined to the step portion 2d provided over the entire circumference via the joining layer 7a formed of the joining material 7 so as to close the depressed portion 2b of the ceramic package 2. Also in this case, the container member 1 has therein the hollow discharge space S formed by the ceramic package 2 and the light transmitting member 3 joined to the sidewalls 2a of the ceramic package 2 via the joining layer 7a formed of the joining material 7 so as to close the depressed portion 2b.

Herein, the light transmitting property of the light transmitting member 3 means that a wavelength of at least part of the light emitted resulting from the light emission in the discharge space S can be transmitted. The light transmitting inorganic member configuring the light transmitting member 3 is formed of a substantially insulating material. An example of the insulating material includes glass, for example, borosilicate glass, quartz glass or the like. In the meantime, the joining between the ceramic package 2 and the light transmitting member 3 via the joining layer 7a formed of the joining material 7 will be described in detail later.

The discharge space S has a substantially rectangular shape, as seen from a plan view. The substantially rectangular shape of the discharge space S includes a shape where four corner portions are outwardly convex in a curved shape, so as to reduce a possibility of the damage upon assembling, for example. Also, the discharge space S of the container member 1 is defined by the depressed portion 2b, which is formed by the sidewalls 2a having the step portions 2c of the ceramic package 2, and the light transmitting member 3, in a longitudinal section.

In the discharge space S, the inert gas 6 is encapsulated. The inert gas 6 is a gas containing xenon (Xe), krypton (Kr), argon (Ar), neon (Ne) and helium (He) as main components, or a mixed gas thereof.

As shown in FIG. 3, the couple of discharge electrodes 4 are respectively disposed so that one end portion-side (side surface 2ca-side) is disposed on the step portion 2c and a part of the upper surface is thus exposed into the discharge space S and a remaining part of the other end portion-side is disposed in the sidewall 2a of the ceramic package 2. In FIG. 4, the couple of discharge electrodes 4 are respectively disposed so that a tip portion thereof is flush with the side surface 2ca of the step portion 2c. Also, the couple of discharge electrodes 4 may be disposed on the upper surfaces of the step portions 2c so as to be located more outwardly than the side surfaces 2ca of the step portions 2c, inasmuch as the opposite parts 4b are located more inwardly than the inner periphery of the discharge induction electrode 5.

As shown in FIG. 3, the couple of discharge electrodes 4 are disposed on the step portions 2c of the opposite sidewalls 2a of the ceramic package 2, and has the opposite parts 4b disposed to face each other. In this way, the couple of discharge electrodes 4 are provided so that the opposite parts 4b are located to face each other in the discharge space S. That is, the couple of discharge electrodes 4 are disposed on the upper surfaces of the step portions 2c of the sidewalls 2a of the ceramic package 2 so that at least parts thereof are exposed in the discharge space S so as to cause the discharge in the discharge space S.

Also, as shown in FIG. 4, the discharge electrode 4 is disposed to entirely cover the upper surface of the step portion 2c. Also, the discharge electrode 4 may be disposed on the upper surface of the step portion 2c so that parts of both sides in the Y direction of the upper surface of the step portion 2c are exposed.

Since the couple of discharge electrodes 4 are disposed on the upper surfaces of the step portions 2c, the discharge is difficult to occur between the discharge electrodes 4 and the bottom surface 2ba of the ceramic package 2, so that it is possible to suppress a decrease in light emission efficiency.

Also, as shown in FIG. 3, the couple of discharge electrodes 4 have tip portions, which are the opposite parts 4b, and is disposed in the discharge space S so that the tip portions face each other. Also, an interval between the opposite parts 4b of the couple of discharge electrodes 4 is 3 mm to 20 mm, for example.

Also, the heights of the couple of opposite step portions 2c (heights of the side surfaces 2ca) are set so that the height of one step portion 2c from the bottom surface 2ba of the step portion 2c is within a range of 65% to 135% of the height of the other step portion 2c from the bottom surface 2ba. Therefore, when the respective heights of the couple of step portions 2c in the Z direction are within the range and the couple of discharge electrodes 4 are provided at the step portions 2c, it is assumed that the couple of discharge electrodes 4 have the opposite parts 4b disposed to face each other. That is, in the Z direction, the couple of discharge electrodes 4 may be disposed so that the opposite parts 4b deviate within the range. Also, the couple of discharge electrodes 4 may deviate in the Y direction inasmuch as they have the opposite parts 4b arranged to face each other in the Z direction.

As shown in FIGS. 1 to 3, the couple of discharge electrodes 4 are led out on the side surfaces in the longitudinal direction (X direction) of the ceramic package 2 from the inside of the discharge space S of the container member to the lower surface-side of the container member 1 by the external electrodes 4a, and the discharge electrodes 4 and the external electrodes 4a are electrically and physically connected. In the meantime, the external electrode 4a also includes an electrode disposed on the lower surface of the container member 1. Also, examples of a material of the external electrode 4a include tungsten, molybdenum, manganese, strontium, lanthanum, and platinum.

Also, of the couple of discharge electrodes 4, one discharge electrode 4 is an anode and the other discharge electrode 4 is a cathode. When the discharge electrode 4 is an anode, examples of the discharge electrode 4 include high-melting-point metal including tungsten. Also, when the discharge electrode 4 is a cathode, examples of the material of the discharge electrode 4 include lanthanum oxide, yttrium oxide, and cerium oxide which have an excellent electron emission property, in addition to tungsten which is a main component. An electrode thickness of the discharge electrode 4 is 5 μm to 500 μm, for example.

As shown in FIG. 3, the discharge induction electrode 5 has an annular shape, is disposed in the ceramic package 2 so as to be below the couple of discharge electrodes 4 and surround the depressed portion 2b, as seen from a plan view. Also, as shown in FIG. 2, the discharge induction electrode 5 has an annular shape and is disposed to surround the bottom surface 2ba (bottom part) of the depressed portion 2b. When the depressed portion 2b has a V-shape, the discharge induction electrode 5 may be disposed in the ceramic package 2 so as to be below the couple of discharge electrodes 4 and surround the bottom surface 2ba (bottom part) of the depressed portion 2b or come close to the inner wall surface of the depressed portion 2b. In the meantime, the discharge induction electrode 5 is shown with the dotted line in FIG. 3(b).

In this way, since the annular discharge induction electrode 5 is disposed in the ceramic package 2 so as to surround the bottom surface 2ba of the depressed portion 2b and not to be exposed to the discharge space S, the scattered reflection of the emitted light, which is caused due to the discharge induction electrode 5, is difficult to occur in the discharge space S of the light-emitting device 10. Also, since in the light-emitting device 10, the annular discharge induction electrode 5 is disposed in the ceramic package 2 so as to be below the couple of discharge electrodes 4 and so as not to be exposed into the discharge space S so that the light emission is not to be disturbed, the decrease in the light emission amount is suppressed.

Also, the discharge induction electrode 5 is disposed in the ceramic package 2 of the container member 1 so as to be below the couple of discharge electrodes 4 and so as not to be exposed into the discharge space S. That is, as shown in FIGS. 3 and 4, since the discharge induction electrode 5 is disposed at the periphery of the sidewalls 2a in the ceramic package 2, it is possible to shorten the distance between the discharge electrode 4 and the discharge induction electrode 5 in the X direction or the Z direction. Thereby, the discharge in the discharge space S can be easily induced by the discharge induction electrode 5. Also, as shown in FIG. 3, the couple of discharge electrodes 4 are disposed so that the opposite parts 4b are located more inwardly than the inner periphery of the annular discharge induction electrode 5, as seen from a plan view.

Also, a thickness of the discharge induction electrode 5 is 5 μm to 300 μm, for example, and a width thereof is 30 μm to 500 μm, for example.

Also, in a region in which the discharge electrode 4 and the discharge induction electrode 5 overlap with each other, as seen from a plan view, the interval between the discharge electrode 4 and the discharge induction electrode 5 in the Z direction is 25 μm to 300 μm, for example. The distance may be shortened so as to easily cause the discharge inasmuch as the annular discharge induction electrode 5 is not contacted with the discharge electrode 4.

Also, a distance between the inner peripheral surface (side surface 2ca) of the sidewall 2a of the ceramic package 2 and the inner periphery of the discharge induction electrode 5 is 10 μm to 500 μm, for example. This distance can be shortened so as to easily cause the discharge inasmuch as the annular discharge induction electrode 5 is not exposed to the inner peripheral surface of the sidewall 2a.

As shown in FIGS. 1 to 3, the discharge induction electrode 5 is led out on each side surface in the width direction (Y direction) of the ceramic package 2 from the inside of the container member 1 to the lower surface-side of the container member 1 by the external electrodes 5a, and the discharge induction electrode 5 and the external electrodes 5a are electrically and physically connected. In the meantime, the external electrode 5a also includes an electrode provided on the lower surface of the container member 1. Also, examples of a material of the external electrode 5a include tungsten, molybdenum, strontium, lanthanum, manganese, and platinum. Also, examples of a material of the discharge induction electrode 5 include high-melting-point metal such as tungsten, molybdenum, strontium, lanthanum, manganese, platinum. The light-emitting device 10 includes the discharge induction electrode 5, so that it is possible to perform preliminary discharge. Therefore, the light-emitting device 10 can stabilize the start of the main discharge by the couple of discharge electrodes 4 and the discharge induction electrode 5.

As described above, the light transmitting member 3 is joined to the sidewalls 2a of the ceramic package 2 via the joining layer 7a formed of the joining material 7, as shown in FIGS. 3 to 5. Also, as shown in FIGS. 3 to 5, the step portion 2d of the light-emitting device 10 is provided over the entire circumference of the inner peripheries-side of the sidewalls 2a of the ceramic package 2, and the light transmitting member 3 is joined to the step portion 2d via the joining layer 7a formed of the joining material 7.

The joining material 7 is composed of glass exhibiting a white color. Since the oxide ceramic powder is contained in the glass, molecules of the oxide ceramic powder exists between molecules of the glass. In particular, as a material having a favorable joining ability with the ceramic package 2 and the glass of the material of the light transmitting member 3, a low-melting-point glass can be used. The low-melting-point glass means glass of which a melting point is within a range of 400° C. to 650° C.

The joining material 7 is composed of a material in which alumina (aluminum oxide, $Al_2O_3$) powder or zirconia (zirconium dioxide, $ZrO_2$) powder serving as the oxide ceramic powders is added to the low-melting-point glass containing bismuth oxide, zinc oxide or silicon oxide as a main component.

The low-melting-point glass and the oxide ceramic powder having the substantially same particle diameter are mixed and pasted as powers using a triple roll. For this reason, since the oxide ceramic powder added in the low-melting-point glass is uniformly dispersed in the low-melting-point glass, the melting point of glass is little changed. Also, since the low-melting-point glass and the oxide ceramic powder is all oxides, the joining ability therebetween is good, and voids are difficult to be generated between the low-melting-point glass and the oxide ceramic powder. Also, since glass properties of the bismuth oxide-based low-melting-point glass such as coefficient of thermal expansion, glass-transition point and softening point can be adjusted through composition control by minor addition of zinc oxide, silicon oxide, boron oxide and alkali earth metal oxide, it is possible to design a material in conformity to a joining target.

In the meantime, the joining between the ceramic package 2 and the light transmitting member 3 is performed at heating temperatures of 500° C. to 700° C., for example. Herein, the low-melting-point glass containing bismuth oxide, zinc oxide or silicon oxide as a main component indicates glass of which the main component is 50 to 90 mass % and any one of bismuth oxide, zinc oxide, silicon oxide, boron oxide and alkali earth metal oxide is included as the remaining component.

Also, the oxide ceramic powder indicates a powder made of a material exhibiting a white color and having reflectance of 70% or greater in all wavelengths of the visible light region (wavelength range of 400 nm to 800 nm), for example. As the material, alumina, zirconia and the like may be exemplified. Also, since the oxide ceramic powder exhibits a white color, it is possible to increase the reflectance by adding the oxide ceramic powder to the low-melting-point glass.

In this way, as shown in FIGS. 3 to 5, the ceramic package 2 and the light transmitting member 3 of the light-emitting device 10 are joined to each other via the joining layer 7a formed of the joining material 7, the joining layer 7a is located between the step portion 2d and the light transmitting member 3, and a part of the joining layer 7a faces toward the discharge space S.

Specifically, the joining material 7 is a material in which the alumina or zirconia powder is added to the low-melting-point glass containing bismuth oxides as a main component. For example, the alumina powder is added to the low-melting-point glass including $Bi_2O_3/SiO_2/B_2O_3$. Also, the alumina powder or zirconia powder is added to the low-melting-point glass containing zinc oxide as a main component. For example, the alumina powder or zirconia powder is added to the low-melting-point glass including $ZnO/SiO_2/B_2O_3/R_2O$ (R: alkali metal such as lithium, sodium or potassium). Also, the alumina powder or zirconia powder is added to the low-melting-point glass containing silicon oxides as a main component. For example, the alumina powder is added to the low-melting-point glass including $SiO_2/RO/R_2O$ (R: alkali metal such as lithium, sodium or potassium).

Herein, as the joining material 7, a material in which the low-melting-point glass exhibiting a white color contains bismuth oxides as a main component and the oxide ceramic powder is the alumina powder is described below.

Figure 7:
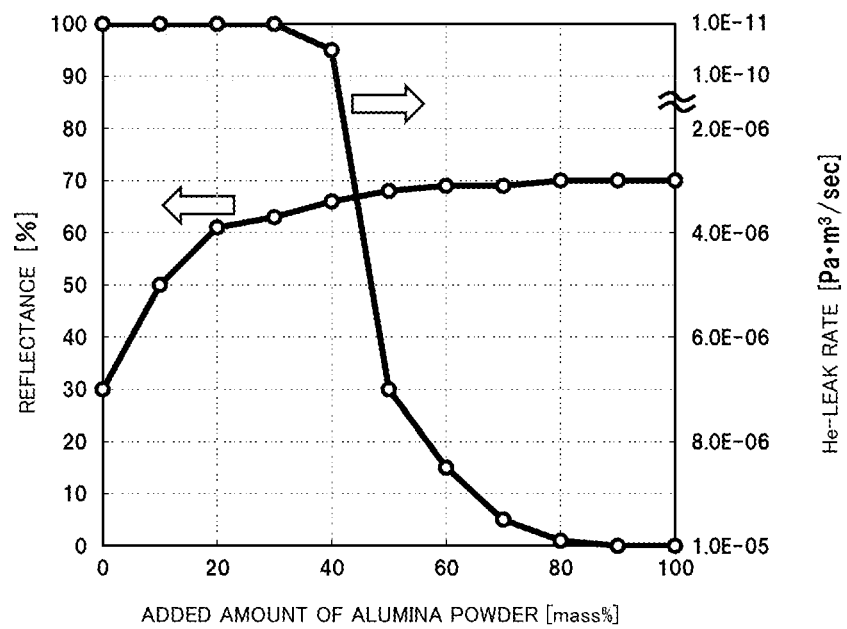
FIG. 7 is a graph illustrating a relationship between an added amount of alumina and reflectance and a relationship between the added amount of alumina and a He-leak rate in an oxygen atmosphere.

FIG. 7 illustrates a relationship between an added amount of alumina (mass %) and the reflectance and a relationship between the added amount of alumina (mass %) and a He-leak rate. FIG. 7 illustrates a relationship between the added amount of alumina powder (mass %) and the reflectance and a relationship between the added amount of alumina powder (mass %) and the He-leak rate when the ceramic package 2 and the light transmitting member 3 are joined by the joining material 7 in an oxygen atmosphere.

When the added amount of alumina powder is 0 mass %, the joining material 7 is formed of only the low-melting-point glass, and when the added amount of alumina powder is 100 mass %, the joining material 7 is formed of only the alumina powder. However, when the added amount of alumina powder is 100 mass %, there is no function as a joining material. Also, when the added amount of alumina powder is 40 mass %, for example, it indicates that the low-melting-point glass of the joining material 7 is 60 mass %.

Herein, the reflectance and the He-leak rate shown in FIG. 7 are respectively described below.

The reflectance indicates a value as to a change in the added amount of the alumina powder to the low-melting-point glass containing bismuth oxides as a main component. The reflectance was measured in the visible light region with a spectrophotometer by using a sample, which was manufactured by coating the low-melting-point glass having the alumina powder added thereto onto the light transmitting member 3 in a thickness of about 100 nm and applying the same thermal hysteresis as a manufacturing process of the ceramic package 2.

Also, the He-leak rate is obtained by a He-leak test and is to evaluate airtightness of the container member 1 resulting from the joining between the ceramic package 2 and the light transmitting member. In a measurement method, the container member 1 (the ceramic package 2 and the light transmitting member 3 are joined) is first subjected to a He-pressurizing condition. Then, when there is a leak path (a part in which the airtightness is broken) in the container member 1 subjected to the He-pressurizing condition, He enters the container member 1 through the leak path. Therefore, when He entering the container member 1 is vacuumed and is effectively taken out from the container member 1, it is possible to obtain a He-leak rate from a detected amount of the He gas.

The container member 1 includes the light transmitting member 3 which is attached to the ceramic package 2 via the joining layer 7a formed of the joining material 7, the joining layer 7a is positioned between the step portion 2d of the sidewalls 2a and the light transmitting member 3, and a part of the joining layer 7a faces toward the discharge space S. Therefore, the light resulting from the discharge between the couple of discharge electrodes 4 in the discharge space S of the container member 1 is partially incident on the joining layer 7a. For example, the light incident on the joining layer 7a is partially reflected on the joining layer 7a, and the remaining light is transmitted therethrough and is diffusively reflected in the joining layer 7a, so that the light is emitted to the inside or outside of the container member 1 or is absorbed in the joining layer 7a. Therefore, the light loss is likely to occur in the joining layer 7a of the container member 1. Due to the light loss in the joining layer 7a, the light emission amount may be decreased in the light-emitting device 10.

However, the ceramic package 2 and the light transmitting member 3 of the light-emitting device 10 are joined via the joining layer 7a formed of the joining material 7, and the joining material 7 includes the alumina powder added to the low-melting-point glass containing bismuth oxides as a main component. Therefore, as shown in FIG. 7, as the added amount of alumina powder increases, the reflectance increases. For example, when the added amount of alumina powder is 10 mass %, the reflectance is 50%, which is higher than 30% which is the reflectance when the added amount of alumina powder is 0 mass % (i.e., the alumina powder is not added). The reflectance of the light-emitting device 10 is increased by adding the alumina powder to the joining material 7. However, in order to further increase the reflectance, the added amount of alumina powder to the low-melting-point glass is preferably 20 mass % or greater.

Therefore, in the light-emitting device 10, the reflectance of the joining layer 7a increases, so that the amount of light, which is reflected into the discharge space S, of the light incident on the joining layer 7a increases. Thereby, it is possible to suppress the decrease in the light emission amount. In this way, the reflectance of the joining layer 7a is improved, so that the light reflected on the joining layer 7a is incident on the upper surfaces (surfaces) of the couple of discharge electrodes 4, and the incident light is reflected on the upper surfaces (surfaces) of the discharge electrodes 4, is transmitted through the light transmitting member 3 and is emitted to the outside. Therefore, the light-emitting device 10 can suppress the decrease in the light emission amount. Also, the light reflected on the joining layer 7a is incident on the inner wall surface in the ceramic package 2, and the incident light is reflected on the inner wall surface, is transmitted through the light transmitting member 3 and is emitted to the outside. Therefore, the light-emitting device 10 can suppress the decrease in the light emission amount.

In the meantime, as shown in FIG. 7, as the added amount of alumina powder increases, the airtightness is more likely to decrease. Therefore, in order to keep the airtightness of the inert gas 6 encapsulated inside the container member 1, the light-emitting device 10 preferably has the He-leak rate less than $1.0 \times 10^{-10}$ Pa·m$^3$/sec. Meanwhile, in the graph of FIG. 7, "$1.0 \times 10^{-10}$" is denoted as "1.0E-10". Therefore, in the light-emitting device 10, the added amount of alumina powder to the low-melting-point glass is preferably 40 mass % or less. In the meantime, from standpoints of the joining property or the airtightness, the added amount of alumina powder is preferably less than 50 mass %.

Therefore, in the light-emitting device 10, the added amount of alumina powder to the low-melting-point glass can be set to 20 to 40 mass %, considering the compatibility of the reflectance and the airtightness.

Figure 8:
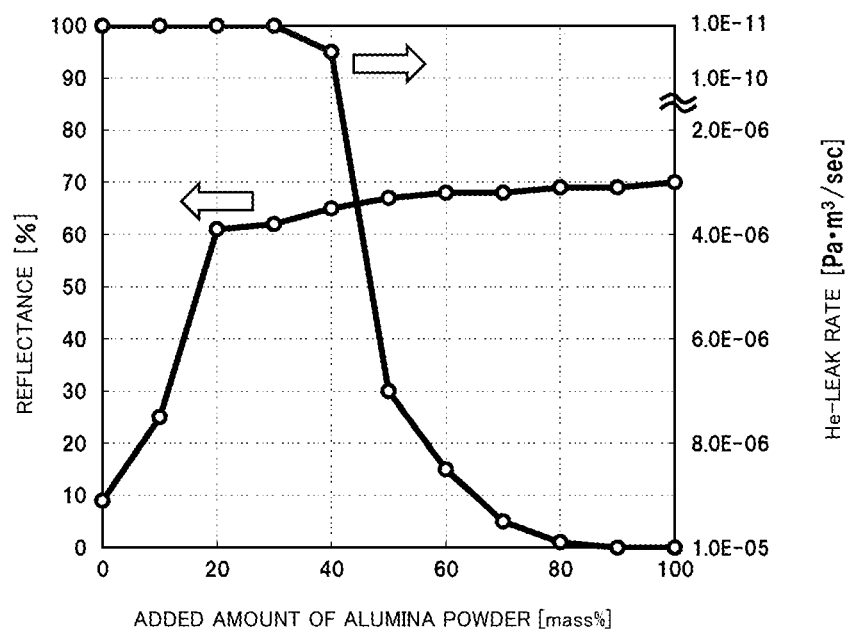
FIG. 8 is a graph illustrating a relationship between an added amount of alumina and reflectance and a relationship between the added amount of alumina and a He-leak rate in a non-oxygen atmosphere.

Also, FIG. 8 illustrates a relationship between the added amount of alumina powder (mass %) and the reflectance and a relationship between the added amount of alumina powder (mass %) and the He-leak rate when the ceramic package 2 and the light transmitting member 3 are joined by the joining material 7 in a non-oxygen atmosphere. FIG. 8 illustrates a relationship between the added amount of alumina powder and the reflectance and a relationship between the added amount of alumina powder and the He-leak rate when the ceramic package 2 and the light transmitting member 3 of the light-emitting device 10 are joined via the joining layer 7a formed of the joining material 7 in the non-oxygen atmosphere. In FIG. 8, the non-oxygen atmosphere is a nitrogen atmosphere.

For the couple of discharge electrodes 4, a high-melting-point metal material such as tungsten, molybdenum or the like is used so as to endure the heat upon the discharge. However, the high-melting-point metal material is susceptible to oxidation. When tungsten is used for the couple of discharge electrodes 4, for example, if the ceramic package 2 and the light transmitting member 3 are joined via the joining layer 7a formed of the joining material 7 in the oxygen atmosphere, the joining layer 7a is oxidized, so that the function as the discharge electrode is degraded and the discharge efficiency is likely to be lowered. Also, as the discharge electrode 4 is oxidized, the discharge does not occur. Therefore, when an easily-oxidizable metal material is used for the couple of discharge electrodes 4, the ceramic package 2 and the light transmitting member 3 are joined in the non-oxygen atmosphere so as to suppress the oxidation of the couple of discharge electrodes 4.

As described above, the joining between the ceramic package 2 and the light transmitting member 3 is performed in the non-oxygen atmosphere. However, the non-oxygen atmosphere is not limited to the nitrogen atmosphere. The joining between the ceramic package 2 and the light transmitting member 3 in the non-oxygen atmosphere may be performed in vacuum or forming gas (mixed gas of hydrogen and ammonia) or in a reducing atmosphere. In the vacuum, the bismuth oxide is dissociated (reduced) by heating and is likely to be a metal state from a suboxidation state. Also, in the forming gas, the bismuth oxide is likely to be a metal state from a suboxidation state due to a reduction action of the hydrogen gas.

As shown in FIG. 8, when the added amount of alumina powder is 0 mass % in the nitrogen atmosphere, the reflectance is 10%. The reason is as follows. That is, when the ceramic package 2 and the light transmitting member 3 are joined to each other via the joining layer 7a formed of the joining material 7 in the nitrogen atmosphere, the oxygen of the bismuth oxide is lost by the reducing property of nitrogen in the atmosphere, so that the bismuth oxide is likely to be a suboxidation state. Thereby, the joining material 7 is likely to be a color of a metal component of bismuth and is blackened, so that the reflectance is lower, as compared to the case where the joining is performed in the oxygen atmosphere. Therefore, the reflectance is lower than 30% which is the reflectance when the added amount of alumina powder is 0 mass % in the oxygen atmosphere.

The added alumina powder supplies the oxygen to the bismuth oxides at the suboxidation state. Thereby, the bismuth oxide at the suboxidation state is supplied with the oxygen from the alumina powder, so that the oxidation proceeds and thereby the original white color of the bismuth oxide can be kept. Therefore, it is possible to suppress the decrease in the reflectance. Also, it is possible to increase the reflectance by adding the alumina powder exhibiting a white color.

The joining material 7 is obtained by adding the alumina powder to the low-melting-point glass containing bismuth oxides as a main component, and the reflectance thereof increases as the added amount of alumina powder to the low-melting-point glass increases, as shown in FIG. 8. For example, when the added amount of the alumina powder is 10%, the reflectance is 25%, which is higher than 10% which is the reflectance when the added amount of alumina powder is 0 mass %, i.e., the alumina powder are not added.

Like this, when the alumina powder is added, the reflectance is increased and the oxygen is supplied to the bismuth oxides at the suboxidation state, so that the bismuth oxides are suppressed from being the suboxidation state. Thereby, it is possible to keep the white color of the bismuth oxides and to suppress the decrease in the reflectance.

The reflectance of the light-emitting device 10 is increased by adding the alumina powder. In order to further improve the reflectance, the added amount of alumina powder to the low-melting-point glass may be set to 20 mass % or greater.

Therefore, according to the light-emitting device 10, the reflectance of the joining layer 7a is improved, so that the amount of light, which is reflected into the discharge space S, of the light incident on the joining layer 7a increases. Thereby, it is possible to suppress the decrease in the light emission amount. Like this, according to the light-emitting device 10, the reflectance of the joining layer 7a is improved, so that the light reflected on the joining layer 7a is incident on the upper surfaces (surfaces) of the couple of discharge electrodes 4 and the incident light is reflected on the upper surfaces (surfaces) of the discharge electrodes 4, is transmitted through the light transmitting member 3 and is emitted to the outside. Thereby, it is possible to suppress the decrease in the light emission amount. Also, for example, the light reflected on the joining layer 7a is incident on the inner wall surface in the ceramic package 2 and the incident light is reflected on the inner wall surface, is transmitted through the light transmitting member 3 and is emitted to the outside, so that the light-emitting device 10 can suppress the decrease in the light emission amount.

Also, as shown in FIG. 8, as the added amount of alumina powder increases, the airtightness is likely to be degraded. Thus, in order to keep the airtightness of the inert gas 6 encapsulated inside the container member 1, the He-leak rate may be less than $1.0 \times 10^{-10}$ Pa·m$^3$/sec. In the meantime, also in the graph of FIG. 8, "$1.0 \times 10^{-10}$" is denoted as "1.0E-10". Therefore, in the light-emitting device 10, the added amount of alumina powder to the low-melting-point glass may be 40 mass % or less.

Like this, in the light-emitting device 10, the added amount of alumina powder to the low-melting-point glass may be set to 20 mass % to 40 mass %, considering the compatibility of the reflectance and the airtightness.

Figure 9:
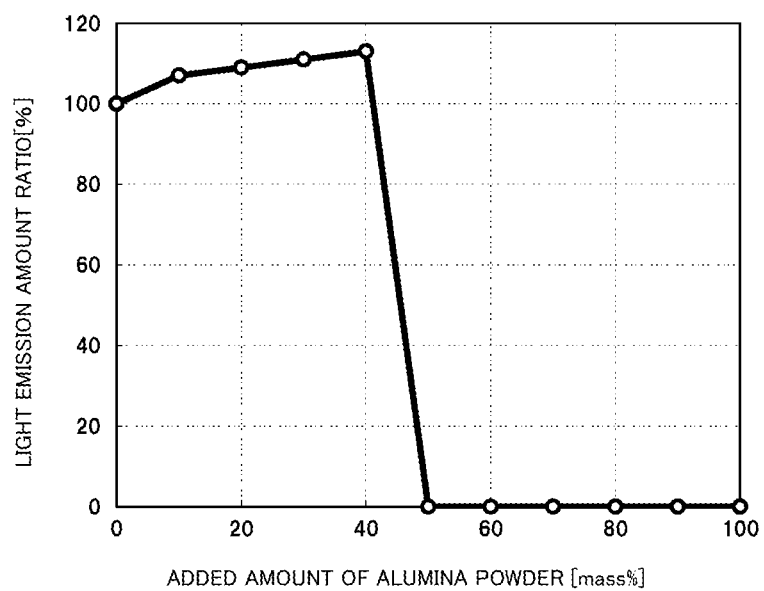
FIG. 9 is a graph illustrating a relationship between the added amount of alumina and a light emission amount in the non-oxygen atmosphere.

Also, FIG. 9 illustrates a relation between the added amount of alumina powder (mass %) and a light emission amount ratio (%). In FIG. 9, when the added amount of alumina powder of the joining material 7 is 0 mass %, the joining material is made of only the low-melting-point glass, and when the added amount of alumina powder is 100 mass %, the joining material is made of only the alumina powder. However, when the added amount of alumina powder is 100 mass %, there is no function as a joining material. Also, when the added amount of alumina powder is 40 mass %, for example, it indicates that the low-melting-point glass of the joining material 7 is 60 mass %.

Herein, the light emission amount ratio shown in FIG. 9 is described. The light emission amount ratio indicates a light emission amount ratio when the added amount of alumina powder is increased, on the basis of the added amount of alumina powder of 0 mass %. It can be seen that when the added amount of alumina powder to the low-melting-point glass is increased, the light emission amount of the light-emitting device is improved until the added amount of alumina powder becomes 40 mass %. When the added amount of alumina powder is further increased, the amount of the low-melting-point glass in the joining material 7 is reduced, so that the measurement could not be made due to the airtightness defect caused in the light-emitting device. In the meantime, the light emission amount was measured using a measurement device CM-A148 available from Konica Minolta, Inc., the measurement wavelength region was 360 nm to 740 nm, and the light emission amount was measured by total luminous flux measurement.

Herein, a method of manufacturing the light-emitting device 10 is described.

The ceramic package 2 is composed of a plurality of insulating layers which are laminated one another. The insulating layer is formed of an electrically insulating material such as aluminum oxide sintered body, aluminum nitride sintered body, silicon carbide sintered body, silicon nitride sintered body, mullite sintered body or ceramic material such as glass ceramics, for example. The ceramic package 2 is formed by laminating a plurality of ceramic green sheets by using a ceramic green sheet lamination method, for example.

When the ceramic package 2 is formed of aluminum oxide sintered body, for example, appropriate organic binder, solvent and the like are first added to and mixed with raw material powder such as aluminum oxide, silicon oxide, calcium oxide or magnesium oxide, so that a slurry is formed. Then, the slurry is formed into a sheet shape by a sheet forming method such as a doctor blade method, so that a ceramic green sheet becoming the insulating layer is obtained.

Then, a paste layer becoming the couple of discharge electrodes 4 and the discharge induction electrode 5 is formed by applying screen printing or otherwise to the ceramic green sheet, depending on the configurations of the couple of discharge electrodes 4, the discharge induction electrode 5 and the like of the ceramic package 2. Also, in the same manner, a paste layer becoming the external electrodes 4a and the external electrodes 5a of the lower surface of the ceramic package 2 is formed by applying the screen printing or otherwise to the ceramic green sheet.

Also, for forming the external electrodes 4a and the external electrodes 5a on the side surfaces of the ceramic package 2, a paste layer becoming the external electrodes 4a and the external electrodes 5a is formed by applying the screen printing or otherwise to the ceramic green sheet, in the same manner. Then, a plurality of punched ceramic green sheets is laminated at positions of the external electrodes 4a and the external electrodes 5a by using a ceramic green sheet lamination method or otherwise.

Also, in order to form the depressed portion 2b of the ceramic package 2, the ceramic green sheet is formed with a through-hole becoming the depressed portion 2b by a hole forming method using a punching mold or the like.

When the ceramic package 2 is made of the ceramic material, for example, the metal material such as tungsten (W), molybdenum (Mo), molybdenum-manganese (Mo—Mn), copper (Cu), silver (Ag) or silver-palladium (Ag—Pd) can be used for each electrode.

In the process of manufacturing the ceramic green sheet for the ceramic package 2, a conductive paste becoming the electrode is obtained by adding and mixing the appropriate organic binder, solvent and the like with powder of tungsten (W), molybdenum (Mo), molybdenum-manganese (Mo—Mn), copper (Cu), silver (Ag) or silver-palladium (Ag—Pd). The conductive paste is beforehand applied by printing in a predetermined pattern on the ceramic green sheet becoming the ceramic package 2 by using the screen printing method, so that a paste layer is formed. Thereafter, the firing is performed at the same time with the plurality of laminated ceramic green sheets becoming the ceramic package 2, so that the couple of discharge electrodes 4, the discharge induction electrode 5, the external electrodes 4a and the external electrodes 5a are formed at predetermined positions of the ceramic package 2.

The ceramic green sheet is cut into an appropriate size and the plurality of ceramic green sheets is laminated to constitute the ceramic package 2, so that a stacked body is manufactured. Thereafter, the stacked body is fired at temperatures of about 1600° C. in the reducing atmosphere, so that the ceramic package 2 having the plurality of insulating layers laminated is manufactured. Also, the reducing atmosphere is a nitrogen atmosphere, for example.

In this way, the ceramic package 2 is provided with the couple of discharge electrodes 4 and the discharge induction electrode 5, the side surfaces and the lower surface thereof are provided with the external electrodes 4a connected to the discharge electrode 4 and the external electrodes 5a connected to the discharge induction electrode 5.

Then, the light transmitting member 3 is joined to the ceramic package 2 via the joining layer 7a formed of the joining material 7 so as to close the depressed portion 2b.

When performing the joining in the oxygen atmosphere, a following method may be adopted. That is, the glass paste (obtained by adding and mixing the appropriate binder, solvent and the like to the low-melting-point glass having the alumina powder added thereto) serving as the joining material 7 is applied to the sidewall 2a or the joining region of the light transmitting member 3 by using the screen printing method, in conformity to the shape of the joining region between the ceramic package 2 and the light transmitting member 3. Subsequently, the light transmitting member 3 is placed on the step portion 2d of the sidewalls 2a of the ceramic package 2 by using an alignment jig conforming to the shape of the light transmitting member 3 or the ceramic package 2, and a binder removing process of removing the solvent or binder component included in the joining material 7 is performed at heating temperatures of 200° C. to 300° C., for example. Then, the ceramic package 2 and the light transmitting member 3 are joined to each other at heating temperatures of 500° C. to 700° C., for example. By this process, it is possible to obtain the container member 1.

In the meantime, even when the discharge electrode 4 is formed of an easily-oxidizable metal material such as tungsten, for example, it is difficult to be oxidized at heating temperatures of 200° C. to 300° C.

Also, when performing the joining in the non-oxygen atmosphere, the joining is performed by the same method as the joining in the oxygen atmosphere. In the meantime, the binder removing process of removing the solvent or binder component included in the glass paste serving as the joining material 7 at heating temperatures of 200° C. to 300° C. may also be performed in the oxygen atmosphere.

Also, for example, the ceramic package 2 is provided with a gas introduction hole (not shown) for introducing the inert gas 6 into the container member 1, and the inert gas 6 (Xe gas) is introduced into the container member 1 through the gas introduction hole. In the meantime, the gas introduction hole is sealed after introduction of the inert gas 6.

Next, a method of obtaining the joining material 7 by adding the oxide ceramic powder to the low-melting-point glass exhibiting a white color is described.

The joining material 7 is obtained by mixing the low-melting-point glass containing powder of bismuth oxide as a main component and alumina powder with the appropriate solvent or binder while pulverizing the powder by a mortar and then dispersing the same by using a triple roll or otherwise.

Also, the low-melting-point glass containing bismuth oxides as a main component is powder whose particle diameter is 0.5 µm to 10 µm, and the alumina powder has a particle diameter of 0.2 µm to 10 µm, for example.

The invention is not limited to the light-emitting device 10 of the above embodiment and various changes or modifications are possible without departing from the scope of the invention. In the following, other embodiments of the invention are described. In the light-emitting device of the other embodiments, the same parts as the light-emitting device 10 of the above embodiment are denoted by the same reference numerals, and the descriptions thereof are appropriately omitted.

Figure 6:
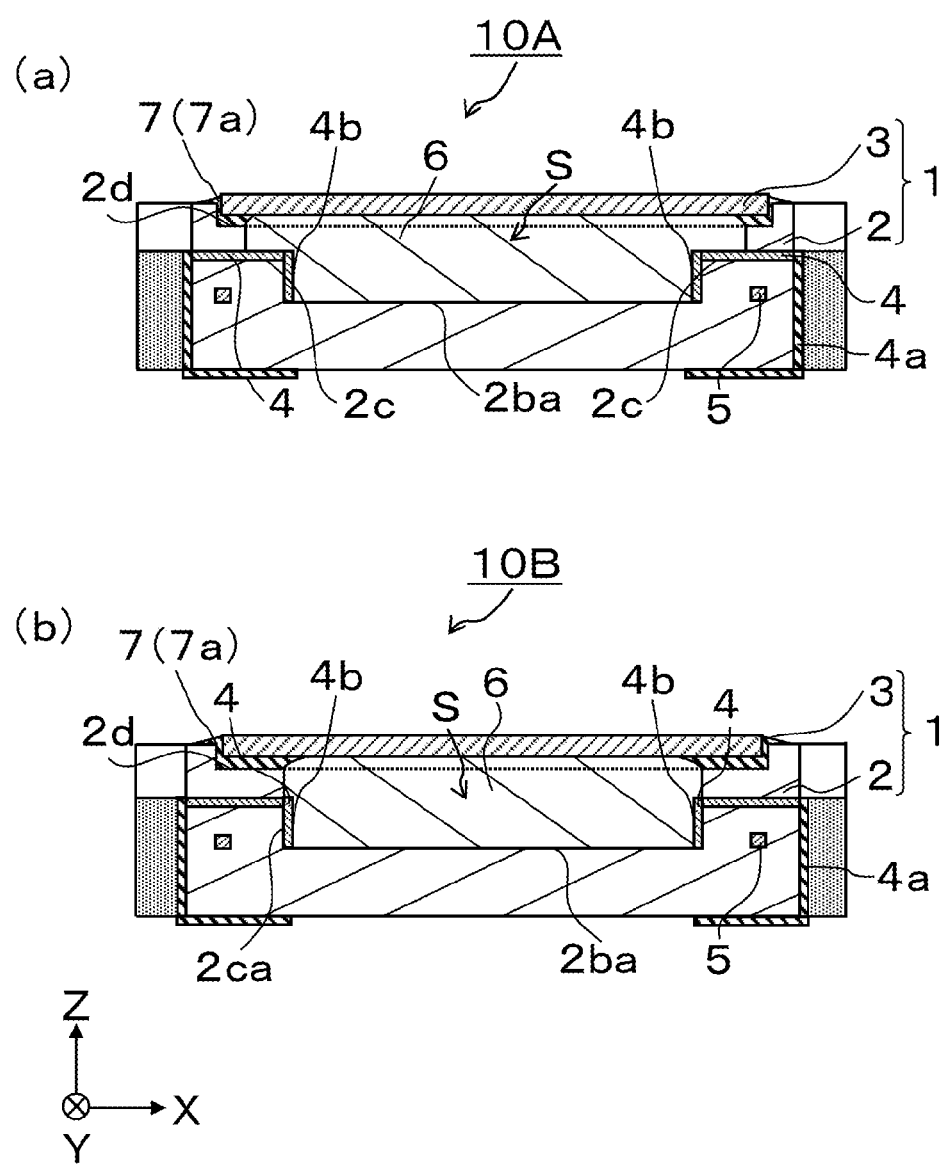
FIGS. 6(a) and 6(b) are another examples of the light-emitting device according to another embodiment of the invention, respectively, and are sectional views taken along the line A-A in FIG. 3(a)

As shown in FIG. 6(a), a light-emitting device 10A may have a configuration where the couple of discharge electrodes 4 extends downward (toward the bottom surface 2ba) along the inner peripheral surfaces of the sidewalls 2a. In this case, the parts, which extend downward and are provided on the inner peripheral surfaces, of the couple of discharge electrodes 4 are the opposite parts 4b.

Also, the couple of discharge electrodes 4 are exposed to the discharge space S, and the discharge is caused from one exposed discharge electrode 4 with respect to the other opposite discharge electrode 4 at a part at which a distance between electrodes is shortest, in the inert gas 6 (Xe). At this time, the discharge electrode 4 is worn and rounded at a locally discharged part thereof, and in a next discharge, the discharge is caused from a separate place of the one discharge electrode 4 with respect to the other discharge electrode 4.

Also, as shown in FIG. 6(b), a light-emitting device 10B may have a configuration where the couple of discharge electrodes 4 are disposed on the sidewalls 2a of the ceramic package 2 so as to reach the inner peripheral surfaces from the inside of the sidewalls 2a and extends downward (toward the bottom surface 2ba) from the part reaching the inner peripheral surfaces along the inner peripheral surfaces (side surfaces 2ca) of the sidewalls 2a. In this case, the parts provided on the inner peripheral surfaces (side surfaces 2ca) of the couple of sidewalls 2a are the opposite parts 4b of the discharge electrodes 4.

The invention claimed is:

1. A light-emitting device, comprising:
   a container member comprising a ceramic package provided with a depressed portion serving as a discharge space, and a light transmitting inorganic member which is attached to the ceramic package via a joining layer formed of a joining material closing the depressed portion;
   an inert gas encapsulated inside the discharge space;
   a couple of discharge electrodes which are disposed in the depressed portion of the ceramic package being spaced from each other; and
   an annular discharge induction electrode disposed in the ceramic package below the couple of discharge electrodes and surrounding the depressed portion,
   the joining material comprising glass exhibiting a white color, and oxide ceramic powder.

2. The light-emitting device according to claim 1, wherein the glass is a low-melting-point glass containing bismuth oxide, zinc oxide or silicon oxide as a main component.

3. The light-emitting device according to claim 1, wherein the oxide ceramic powder is alumina powder.

* * * * *